(12) United States Patent  (10) Patent No.: US 8,189,264 B2
Abe et al.  (45) Date of Patent: May 29, 2012

(54) PROJECTION OPTICAL SYSTEM AND IMAGE DISPLAY DEVICE

(75) Inventors: Issei Abe, Yokohama (JP); Kazuhiro Fujita, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 453 days.

(21) Appl. No.: 12/392,287

(22) Filed: Feb. 25, 2009

(65) Prior Publication Data

US 2009/0213470 A1 Aug. 27, 2009

(30) Foreign Application Priority Data

Feb. 27, 2008 (JP) ................................. 2008-046534

(51) Int. Cl.
G02B 3/00 (2006.01)

(52) U.S. Cl. ........................................................ 359/649

(58) Field of Classification Search .................. 359/649, 359/651

See application file for complete search history.

(56) References Cited

U.S. PATENT DOCUMENTS

| 4,773,748 | A | 9/1988 | Shih et al. | |
|---|---|---|---|---|
| 6,771,427 | B1 * | 8/2004 | Matsuo | 359/649 |
| 6,989,936 | B2 * | 1/2006 | Hatakeyama | 359/649 |
| 2001/0050758 | A1 | 12/2001 | Suzuki et al. | |
| 2004/0156117 | A1 * | 8/2004 | Takaura et al. | 359/651 |
| 2004/0184163 | A1 | 9/2004 | Nishioka et al. | |
| 2008/0068563 | A1 | 3/2008 | Abe et al. | |
| 2008/0068564 | A1 | 3/2008 | Abe et al. | |
| 2009/0066919 | A1 | 3/2009 | Fujita et al. | |

FOREIGN PATENT DOCUMENTS

| EP | 1 806 612 A1 | 7/2007 |
|---|---|---|
| JP | 9-138349 | 5/1997 |
| JP | 2001-42461 | 2/2001 |
| JP | 2004-309765 | 11/2004 |
| JP | 2005-107218 | 4/2005 |
| JP | 2006-235516 | 9/2006 |
| JP | 2007-79524 | 3/2007 |
| JP | 2007-225776 | 9/2007 |

OTHER PUBLICATIONS

U.S. Appl. No. 12/160,818, filed Jul. 14, 2008, Abe, et al.

* cited by examiner

Primary Examiner — James Greece

(74) Attorney, Agent, or Firm — Oblon, Spivak, McClelland, Maier & Neustadt, L.L.P.

(57) ABSTRACT

A projection optical system, in which a plurality of light flux emitted from one conjugate plane enters another conjugate plane and an image formed on the one conjugate plane is projected on the other conjugate plane, includes: a first optical system including at least one lens; and a second optical system which includes at least two reflecting surfaces with optical power, a normal line of the other conjugate plane from a center of an image projected on the other conjugate plane has no intersection with any space of the first optical system, or the second optical system, or a space between the first optical system and the second optical system, and when a plane defined by a vertical direction of the image projected on the other conjugate plane and an extending direction of the normal line is set as a YZ plane, from the first optical system to the other conjugate plane an optical path intersects only once on the YZ plane.

15 Claims, 10 Drawing Sheets

PROJECTION OPTICAL SYSTEM AND IMAGE DISPLAY DEVICE

CROSS-REFERENCE TO THE RELATED APPLICATION

The entire contents of Japanese patent application No. JP 2008-046534, filed on Feb. 27, 2008, of which the convention priority is claimed in this application, are incorporated hereinto by reference.

BACKGROUND OF THE INVENTION

1. Field of the Invention

The present invention relates to a projection optical system which is configured to project light from an image forming element to a plane to be projected, and relates to an image display device including the projection optical system.

2. Description of the Related Art

JP 2006-235516 A discloses a projection display device which includes a projection optical system having a lens system and one concave mirror. The concave mirror is arranged below the optical axis of the lens system in a largely bulged state. JP 2007-225776 A discloses a back projection type (rear projection type) image projection device, in which projection light from a final mirror crosses an optical path between a lens system and a mirror system, and a screen for the image to be projected on (a screen) is arranged almost in parallel with an optical axis of the lens system, and thinness of the entire device including the screen is improved.

In the projection optical system disclosed in JP 2006-235516 A, the concave mirror bulges largely below the optical axis of the lens system, therefore if the projection optical system is applied to a front projection type device, when constituting a projection device (a projector main body excluding a screen), since a bottom of a case is defined based on a lower end of the concave mirror, an increase in a size of the projection device is necessary, and thus problems arise such that a height of the device is great, and the gravity center of the device is high due to the optical axis being located on an upper side in the case of the device, and instability to an installation surface (a setting plane) of the projector main body is unavoidable.

Similar problems exist in projection devices disclosed in JP 2004-309765 A and JP 2007-079524 A.

In the projection device disclosed in JP 2007-225776 A, with a purpose of reducing a width in a thickness direction of the screen of the entire device which includes a projection optical system unit PU and the screen, a thin device is achieved.

However, due to the projection optical system unit PU being optimized as a rear projector, it can not be applied to a front projector directly.

When the projection optical system unit PU is applied to the front projector, such a structure is available in which light flux is folded in the projection optical system by such as a folding back mirror, to make it possible to view a projection image from a viewing side; however, for the projector main body in which the projection optical system other than the screen is housed in the case, compactness is inhibited, and the cost rise is unavoidable.

SUMMARY OF THE INVENTION

At least an object of the present invention is to provide, for example, a projection optical system including a projector main body. When the projection optical system is applied to a front projector, compactness and setting stability of the projector main body can be obtained, and the projector main body is applicable to both the front projector and a rear projector, without changing its optimized specification, and thus a cost advantage can be achieved by the common use modularization.

Another object of the present invention is to provide an image display device including the above-mentioned projection optical system.

In the present invention, the projection optical system includes a screen, and compactness and setting stability of a part (including a lens system and a reflecting surface) excluding the screen is attempted to be improved.

In light of the above-mentioned, the present invention proposes, for example, a projection optical system, in which a plurality of light flux emitted from one conjugate plane enters another conjugate plane and an image formed on the one conjugate plane is projected on the other conjugate plane, including: a first optical system including at least one lens; and a second optical system which includes at least two reflecting surfaces with optical power, wherein a normal line of the other conjugate plane from a center of an image projected on the other conjugate plane has no intersection with any space of the first optical system, or the second optical system, or a space between the first optical system and the second optical system, and wherein when a plane defined by a vertical direction of the image projected on the other conjugate plane and an extending direction of the normal line is set as a YZ plane, from the first optical system to the other conjugate plane an optical path intersects only once on the YZ plane.

In addition, the present invention proposes, for example, an image display device which includes the above-mentioned projection optical system.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

Figure 1:
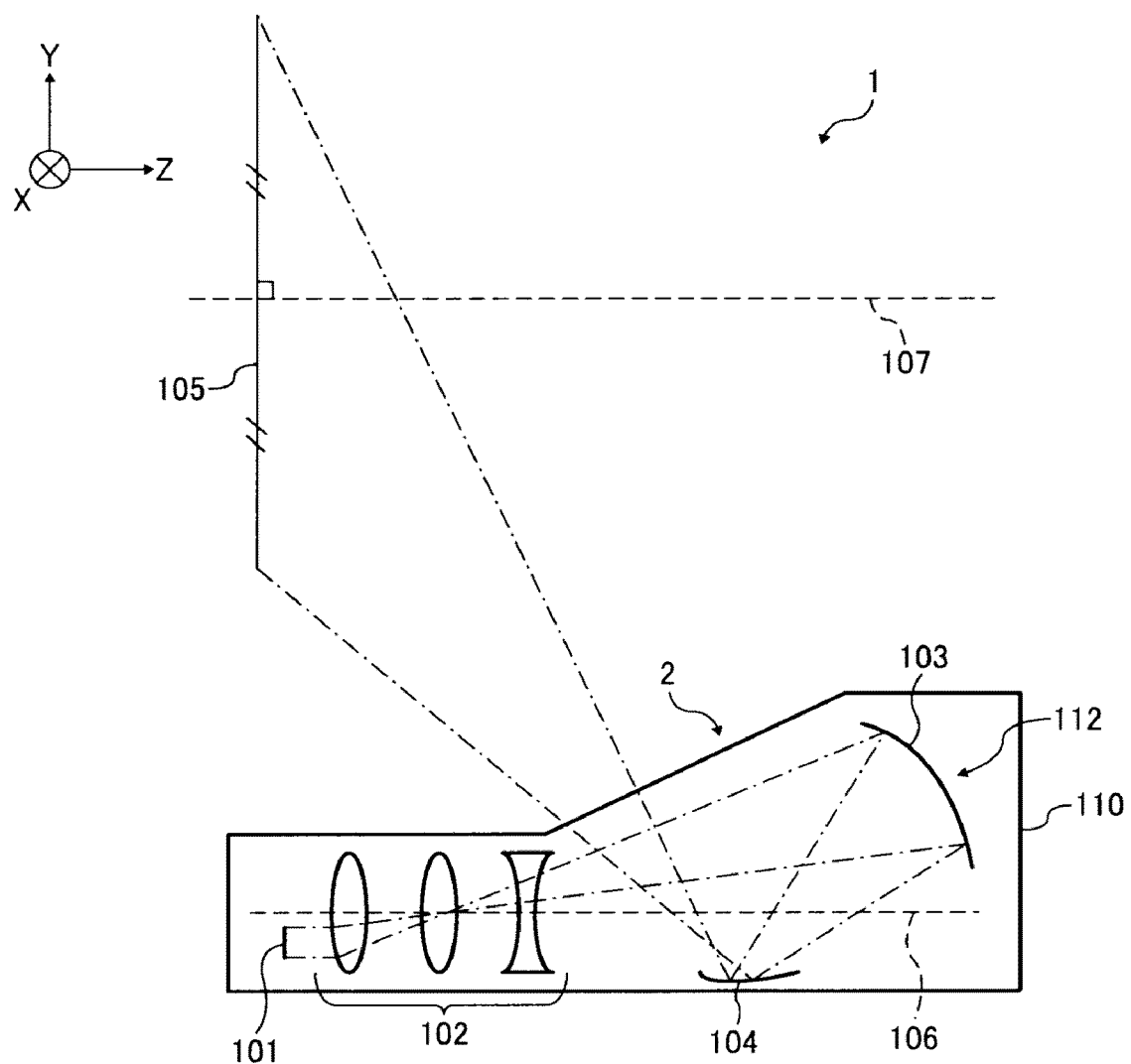
FIG. 1 illustrates a schematic structure of a projection optical system according to a first embodiment of the present invention.

A first embodiment will be explained below with reference to FIGS. 1-3.

A projection optical system 1 of a front projector according to the first embodiment includes a projector main body 2 which has one conjugate plane, and a screen 105 which forms another conjugate plane.

The projector main body 2 includes a case 110. An image forming element 101, a first optical system 102 which has a plurality of lenses, and a second optical system 112 are housed in the case 110.

The second optical system 112 has a first reflecting surface 103 with positive power corresponding to the first optical system 102, and a second reflecting surface 104 with optical power corresponding to the screen 105. Both the reflecting surfaces 103 and 104 have anamorphic adjustable surface shapes.

Here, "a first reflecting surface corresponding to a first optical system" represents a reflecting surface into which light that exits from a first optical system enters first, and "a second reflecting surface corresponding to a screen (a conjugate plane)" represents a reflecting surface into which the light reflected by a first reflecting surface corresponding to the first optical system enters and which reflects the light entered to a direction of the conjugate plane.

An optimization design is performed on the entire optical system so that a desired projection performance such as resolution performance and distortion of light flux emitted from the image forming element 101 which is arranged in the case 110 as the one conjugate plane (conjugate plane A), on the screen 105 as the other conjugate plane (conjugate plane B) is fulfilled. In other words, the first optical system 102 and the second optical system 112 are optimally designed as one.

In addition, the first optical system 102 can also include an optical system having a reflecting surface with power, or having a reflecting surface without power which folds back an optical path, but not only the lenses. Moreover, in FIG. 1, the first optical system 102 includes three lenses, but it is not limited to the optical system consisting of three lenses.

Figure 2:
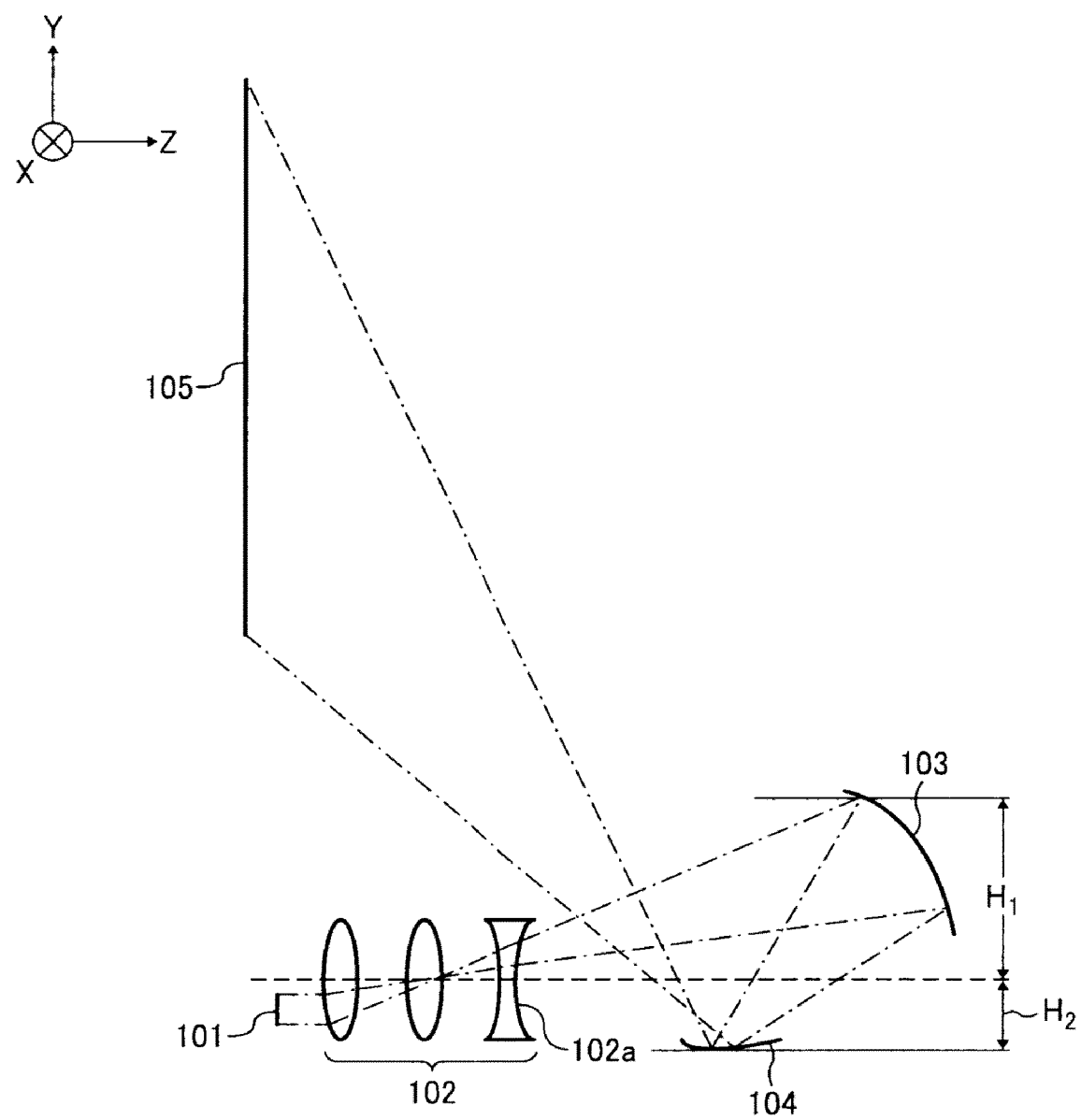
FIG. 2 illustrates arrangement relationships of a lens system and reflecting surfaces according to the first embodiment of the present invention.

The second reflecting surface 104 of the second optical system 112 illustrated in FIG. 1, corresponding to the conjugate plane B, has a concave reflecting surface with positive power, but it is not limited to the concave reflecting surface, since both the concave surface and the convex surface are possible when the optimization design is performed on the entire optical system to satisfy the desired projection performance.

Light flux emitted from the image forming element 101 which is arranged on the conjugate plane A passes through the first optical system 102, and exits from the first optical system 102, and then enters into the concave reflecting surface 103 corresponding to the first optical system, of the second optical system 112.

The light flux which received positive power from the first reflecting surface 103 is reflected thereon and then enters into the second reflecting surface 104 corresponding to the conjugate plane B. The second reflecting surface 104 is disposed in a space opposite the first reflecting surface 103 corresponding to the first optical system of the second optical system 112, relative to an optical axis 106 of the first optical system 102 on an YZ plane, as illustrated in FIG. 1.

Here, the "YZ plane" represents a plane defined by a vertical direction of an image projected on the conjugate plane B, and an extending direction of a normal line 107 from a center of the image projected on the conjugate plane B, i.e. the plane of paper in FIG. 1.

In other words, the "YZ plane" is defined by the center of the image projected on the screen 105 and the optical axis 106 of a lens with the largest aperture of the first optical system 102.

Due to the first reflecting surface 103 having positive power, the light that exits is focused with respect to the incidence light. Therefore, the second reflecting surface 104 corresponding to the conjugate plane B can be produced compactly without being large in size.

The light flux reflected by the second reflecting surface 104 corresponding to the conjugate plane B intersects only once with an optical path from the first optical system 102 to the first reflecting surface 103 on the YZ plane, and then is imaged on the screen 105.

"Light flux intersects on the YZ plane" means that light flux that exits from a first optical system (for example in this embodiment the first optical system 102) intersects with light flux reflected by a reflecting surface (for example in this embodiment the second reflecting surface 104) corresponding to the conjugate plane B (for example in this embodiment the screen 105) on the YZ plane.

As above-mentioned, since the light flux reflected by the second reflecting surface 104 of the second optical system corresponding to the conjugate plane B intersects the optical path from the first optical system 102 to the first reflecting surface 103 only once on the YZ plane, the space inside the projection optical system can be effectively used as a necessary and desired space for imaging (necessary space to fulfill the projection performance), and therefore a space occupied by an imaging system from an object to an imaging plane can be effectively used.

Therefore, the imaging system, the projection system, and the projection device can be produced compactly.

Three reflecting surfaces or more are necessary when intersection occurs a plurality of times, as described in JP 2004-309765 A. In this case, three mirrors or more are necessary which are high cost and are strict in positional accuracy when manufacturing, therefore only one time of intersection is preferable.

In addition, when the number of times of intersection is great, image degradation is a concern since the probability of flare light reaching the conjugate plane B rises, therefore only one time of intersection is advantageous from this viewpoint.

Moreover, the entire optical system is arranged such that the normal line 107 of the conjugate plane B which passes the center of the screen 105 on the conjugate plane B does not intersect with the projection optical systems other than the screen. Thus, for example, when a user views a projection image projected on the screen from the right side in FIG. 1, the possibility of interference by the projection optical systems other than the screen is lowered. Therefore, for example, regarding the projector main body 2 in which the projection optical systems other than the screen are housed in one case, when viewing from the right side in FIG. 1, the projection image can be seen without any disturbance by the projector main body 2. That is, this optical system is suitable for an application to a projection device of front projector.

Especially, in the present embodiment, as well as in the second and third embodiments explained later, the entire optical system is arranged such that a tangent line at a lower end of a conjugate plane B along a direction perpendicular to the conjugate plane B (for example in the first embodiment the screen 105) does not intersect with light flux from an image forming element (for example in the first embodiment the image forming element 101) to a reflecting surface (for example in the first embodiment the second reflecting surface 104) corresponding to the conjugate plane B.

Therefore, the effect of lower interference by the projection optical system when watching the projection image projected on the screen is demonstrated remarkably.

An arrangement positional relationship of the reflecting surfaces 103 and 104 of the second optical system 112 will be explained in detail, with reference to FIG. 2 and FIG. 3.

On the YZ plane, with reference to the optical axis 106 of a lens 102a with the maximum aperture of the first optical system 102, if $H_1$ represents the maximum height of an effective diameter of the first reflecting surface 103 corresponding to the first optical system 102 from the optical axis 106, and $H_2$ represents the maximum height of an effective diameter of the second reflecting surface 104 corresponding to the conjugate plane B from the optical axis 106, by setting an absolute value of $H_2$, i.e. $|H_2|$, smaller than an absolute value of $H_1$, i.e. $|H_1|$, the second reflecting surface 104 corresponding to the conjugate plane B is arranged nearer the optical axis 106, and space requirement of the optical systems in a space opposite to the screen 105 with respect to the optical axis 106 (lower side from the optical axis 106 in FIG. 2) is small.

Figure 3A:
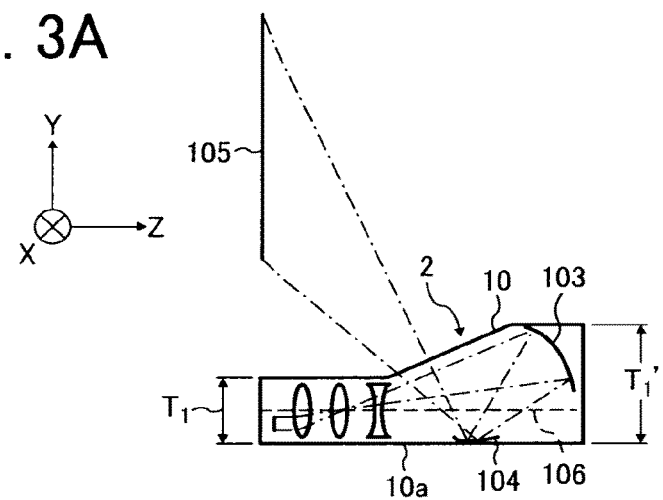
FIG. 3A illustrates a compact structure of the projection optical system according to the first embodiment of the present invention.
Figure 3B:
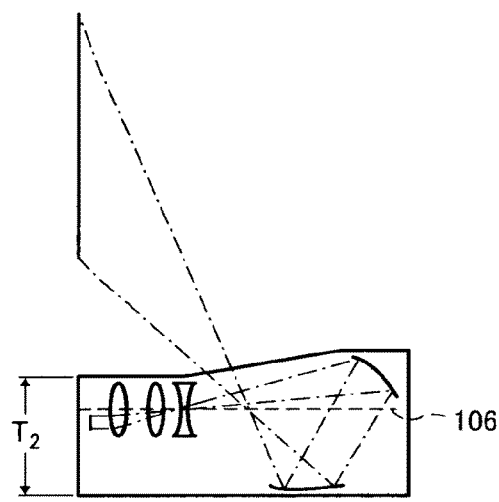
FIG. 3B illustrates an example of a structure of the projection optical system which is not compact.
Figure 3C:
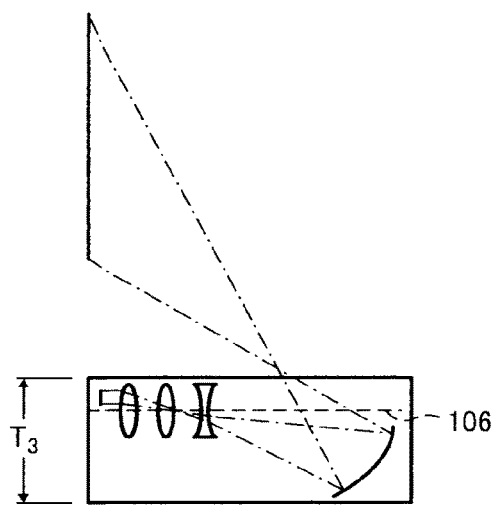
FIG. 3C illustrates a structure of a projection optical system which is not compact according to a conventional technology.

Therefore, as illustrated in FIG. 3A, a thickness of the device (the projector main body 2) including the projection optical system (the lens system and the reflecting surfaces) without the screen 105 is smaller, comparing with a thickness in a case when $H_1$ and $H_2$ are set to be $|H_1|<|H_2|$ (as illustrated in FIG. 3B), and a thickness of an optical system described in an embodiment of JP 2006-235516 A (as illustrated in FIG. 3C), and the device (the projector main body 2) is compact, although there is a bulge in its upper part.

That is, as illustrated in FIG. 3B, $T_2$ represents the thickness of the device in which $|H_1|<|H_2|$, and as illustrated in FIG. 3C, $T_3$ represents the thickness of the device of the embodiment described in JP 2006-235516 A, and $T_1$ represents the thickness of the projection optical system according to the present embodiment, although the bulge exists in the upper part of the device and the total thickness of this part is $T_1'$. $T_1$ is smaller than $T_2$ and $T_3$, therefore the entire device can be produced compactly.

In addition, in each of structures illustrated in FIGS. 3B and 3C, the center of gravity is high and there is a risk of instability when setting, since the optical axis is located at an upper side from the case bottom.

On the other hand, in the projector main body 2 according to the present embodiment, the optical axis is located at a position near the bottom of the case, therefore, the center of gravity is low, and the setting stability can be secured.

The bottom of the case 110 is set such that no useless space exists, with reference to a lower end line of the first optical system 102 along the vertical direction of the image on the screen 105, and the second reflecting surface 104 of the second optical system 112 is disposed between a lower edge of a light flux from the first optical system 102 to the second optical system 112, and a lowest end of elements of the first optical system 102. That is to say, the second reflecting surface 104 is disposed between the lower edge of the light flux from the first optical system 102 to the first reflecting surface 103, and the lowest end line of the lenses of the first optical system 102, therefore, no useless space exists on a downside of the first optical system 102 inside the case 110.

A second embodiment will be explained with reference to FIG. 4 and FIG. 5. Similar parts to the above-mentioned embodiment are assigned the same reference members, and a detailed explanation is omitted. Hereafter, only main parts will be explained.

Figure 4:
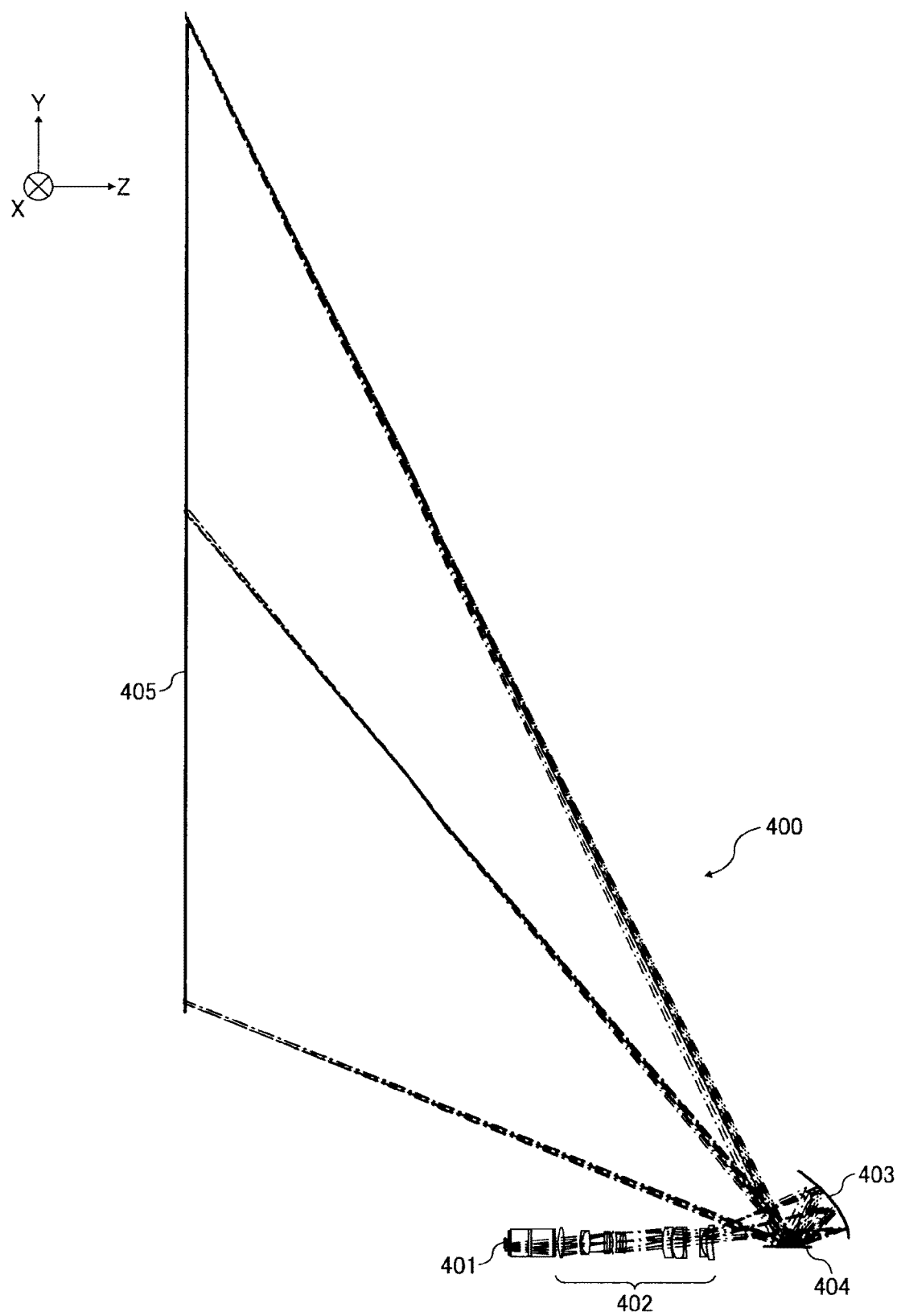
FIG. 4 illustrates a schematic structure of a projection optical system according to a second embodiment of the present invention.
Figure 5:
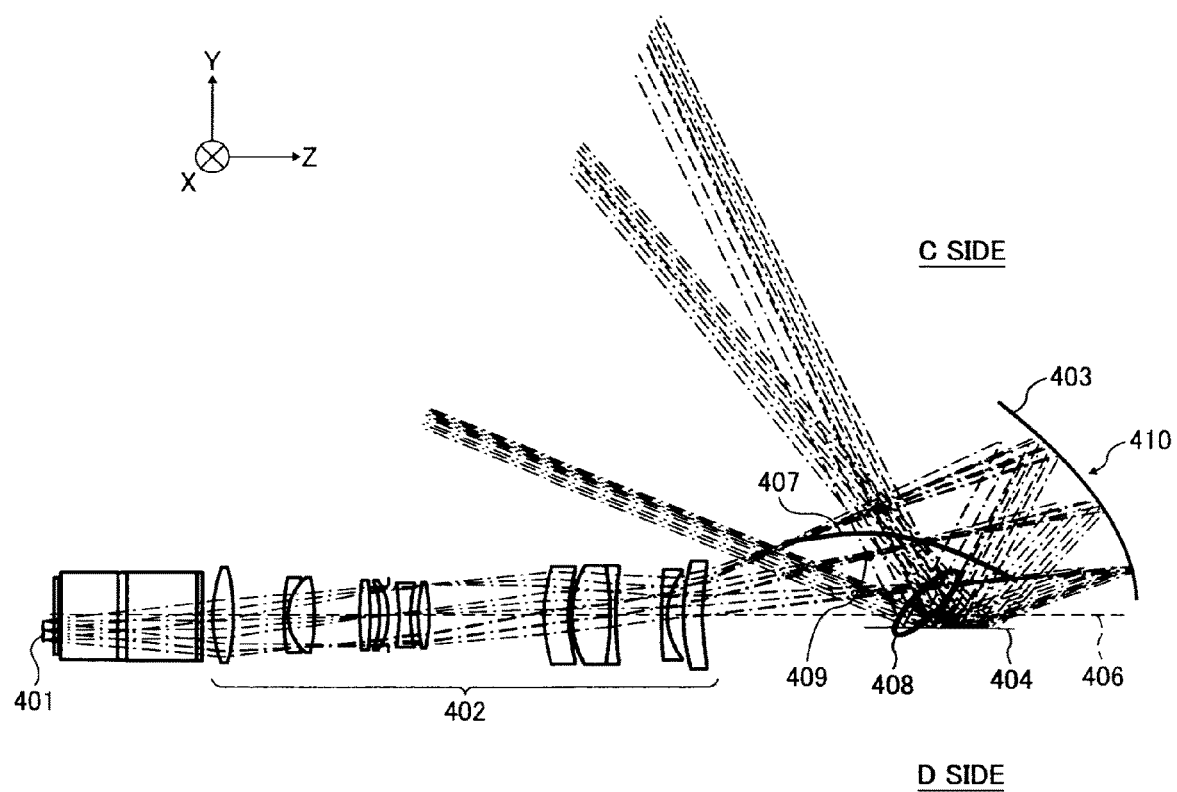
FIG. 5 is an enlarged view of the circumference of an intermediate image according to the second embodiment of the present invention.

FIG. 4 is an overall view of an image display device 400 according to the present embodiment, and FIG. 5 is an enlarged view of a part excluding a screen 405 as illustrated in FIG. 4.

Light flux emitted from an image forming element 401 which is represented by a transmissive liquid crystal panel, a reflective liquid crystal panel, or DMD, enters into a first optical system 402 which is a coaxial optical system formed of lenses only.

In the present embodiment, the first optical system 402 is formed of lenses only, a device which folds an optical path using such as a reflecting surface or a diffractive surface is preferable as well, only if the desired imaging performance is fulfilled. In addition, the first optical system 402 is formed as the coaxial optical system, a decentered optical system is allowable as well, only if the desired imaging performance is fulfilled.

The light flux that has passed through the first optical system 402 forms an intermediate image 407 of the image forming element 401 on the conjugate plane A by only the first optical system 402. The intermediate image 407 is somewhat enlarged relative to the image forming element 401.

The intermediate image 407 is enlarged and projected by two reflecting surfaces of a second optical system 410, i.e., a first reflecting surface 403 with positive power corresponding to the first optical system, and a second reflecting surface 404 corresponding to the conjugate plane B, i.e., the screen 405.

The resolution performance of the intermediate image itself is not a problem only if the intermediate image 407 can be imaged on the screen 405 eventually, with the desired imaging performance. The light flux which is slightly focused at the intermediate image 407 is diffused again, and enters into the first reflecting surface 403 with positive power of the second optical system. Then, the light flux received with positive power passes through an optical axis 406 of the first optical system which is the coaxial optical system, while an entire effective light flux width becomes small, and then enters into the second reflecting surface 404 of the second optical system. The light flux received with power at the second reflecting surface 404 intersects the light flux from the first optical system 402 to the first reflecting surface 403 inside the projection optical system (at an intersection part 409) once, and is projected to the screen 405 on the conjugate plane B.

As a special effect of an optical system in which an intermediate image is obtained once, at an optical path from the second optical system to the screen the light flux which corresponds to a so-called "exit pupil" is gathered once at a gathering place 408, and by disposing the second reflecting surface 404 corresponding to the conjugate plane B of the second optical system in the neighborhood of the gathering place 408, a size of the second reflecting surface 404 can be reduced.

In the optical system in which the intermediate image is obtained once, the light flux can easily intersect, compared with a conventional optical system in which no intermediate image is formed.

In addition, this invention is especially effective for a projection optical system in which a device such as an image forming element is shifted (for example, is shifted from an optical axis of a first optical system), and a projection is performed in a diagonal direction, and a size of a second optical system is larger than an effective diameter of the first optical system.

In such a projection optical system, if there is not the second reflecting surface 404 corresponding to the conjugate plane B of the second optical system 410 of this invention, the projection light flux advances toward another side, for example a D side in FIG. 5, opposite to a side where the first reflecting surface 403 is disposed, for example a C side in FIG. 5, and forms a projection image on the other side (the D side), with reference to the optical axis 406. In the present embodiment, the optical path is bent by the second reflecting surface corresponding to the conjugate plane B of the second optical system, and the light flux intersects with light flux from the first optical system 402 to the first reflecting surface 403 only once and is projected toward the C side, and a space on the C side where the second optical system is shifted can be used effectively.

Therefore, a smaller projection optical system and projection optical device can be achieved.

Figure 6:
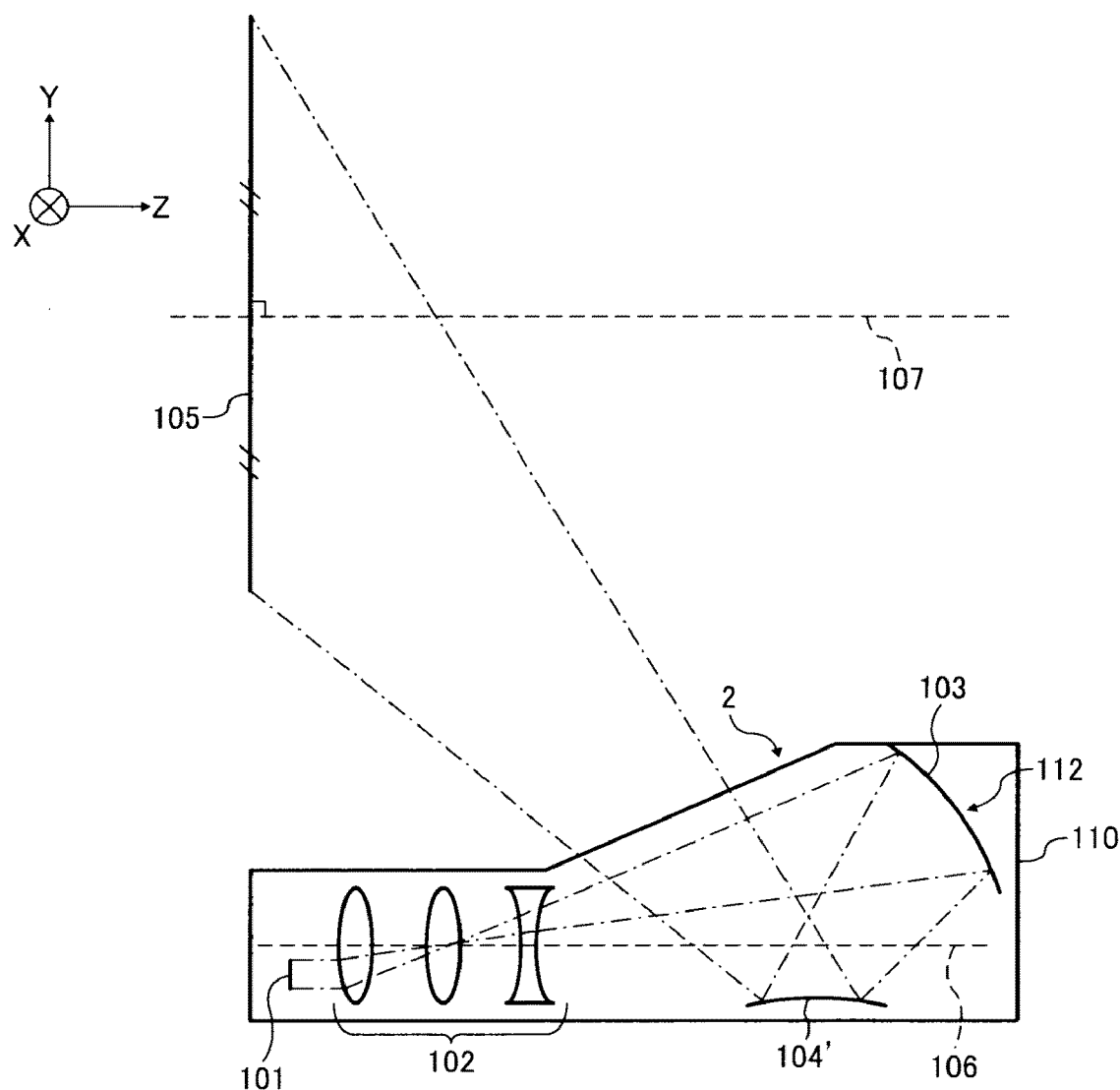
FIG. 6 illustrates a schematic structure of a projection optical system without forming an intermediate image according to a third embodiment of the present invention.

A third embodiment (an example without forming an intermediate image) will be explained with reference to FIG. 6.

In an image display device according to this embodiment, a second reflecting surface 104' corresponding to the conjugate plane B in the second optical system 112 of the projector main body 2, includes a convex reflecting surface with negative power. However it is not limited to the convex reflecting surface, since both the concave and convex surfaces are possible when the optimization design is performed on the entire optical system to fulfill the desired projection performance.

In the structure illustrated in FIG. 1, if the intermediate image is formed between the first and the second optical systems, a great positive power is necessary for the second optical system to image the intermediate image on the screen again, therefore a reflecting surface with positive power, i.e. a concave surface is preferably employed as the second reflecting surface 104 corresponding to the conjugate plane B. In the device without formation of the intermediate image according to this embodiment, to enlarge greatly and project an image on the screen, a reflecting surface with negative power which diffuses light, i.e., a convex surface is preferably employed as the second reflecting surface 104' corresponding to the conjugate plane B.

Figure 7:
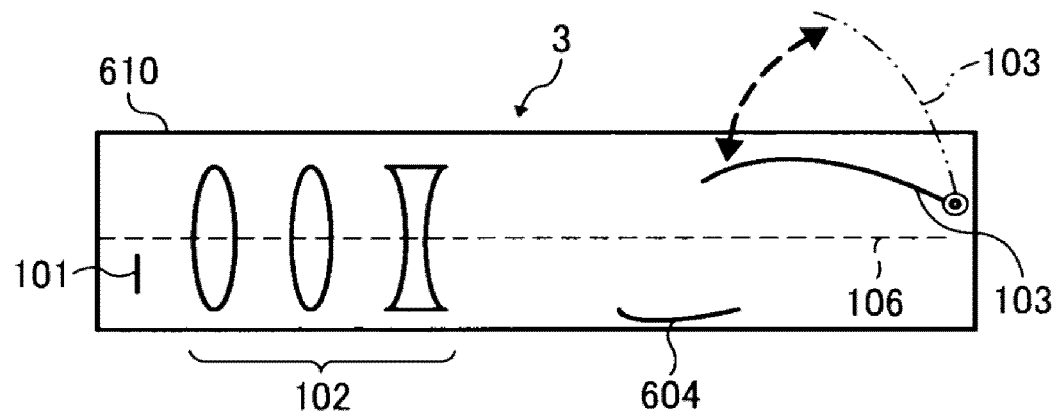
FIG. 7 illustrates a structure of a main part of a projection optical system according to a fourth embodiment of the present invention.

A fourth embodiment of the present invention will be explained with reference to FIG. 7.

A projector main body 3 in a projection optical system according to the fourth embodiment includes a case 610, which is in a rectangular solid shape and is not convexoconcave at its outer surface, compared with the case 110 illustrated in FIG. 1. The image forming element 101, the first optical system 102, and the second optical system 112 are housed in the case 610 without a bulge outside.

The case 610 is formed in the rectangular solid shape, corresponding to a height of the first optical system 102 in the vertical direction of an image on the screen 105. That is, a height of the case 610 in the vertical direction is set to the minimum height required to house the first optical system 102 without useless space, and the compactness is achieved.

The first reflecting surface 103 corresponding to the first optical system 102 of the second optical system 112 is provided to be pivotally supported at a lower end thereof and to be turnable in the vertical direction of the image formed on the screen 105.

An upper surface of the case 610 corresponding to the first reflecting surface 103 is opened, and the rest of the upper surface is covered with a translucent material. When in use, as illustrated in FIG. 7, the first reflecting surface 103 is pulled up from a non-use position (storage position) illustrated by a solid line to a use position illustrated by a chain double-dashed line and is set there, and is positioned by a stopper not illustrated.

The first reflecting surface 103 is stored at the position illustrated by the solid line when the device is not in use (not projecting), and works as a lid as well to close the opening.

For the conventional device illustrated in FIG. 3C, it is not possible to apply such a structure to the projector main body, since the reflecting surface (corresponding to the first reflecting surface 103 in the present embodiment) projects to the bottom side of the case (corresponding to the case 610 in the present embodiment).

Driving of the first reflecting surface 103 can be carried out manually or automatically. If an actuator such as a motor or a solenoid is used as a driving source and the operation is automated, especially when the projector main body 2 is set at the ceiling plane, the first reflecting surface 103 can be easily driven by a remote control operation, and the usability is good.

In addition, such a structure is possible in which, the case 610 is formed with a divided structure, for example a right-and-left divided structure, and the second optical system 112 is slidable relative to the first optical system 102 through a guide rail structure or the like, and is pushed into the case 610 when not in use, and a width of the device in the optical axis direction is shortened. Therefore the device is compact, and the portability and the handling performance can be improved greatly.

Separately from the first reflecting surface 103, a lid which opens and shuts the opening can be provided slidably in the optical axis direction, and thus dust can be prevented from entering the case 610 when not in use.

Figure 8:
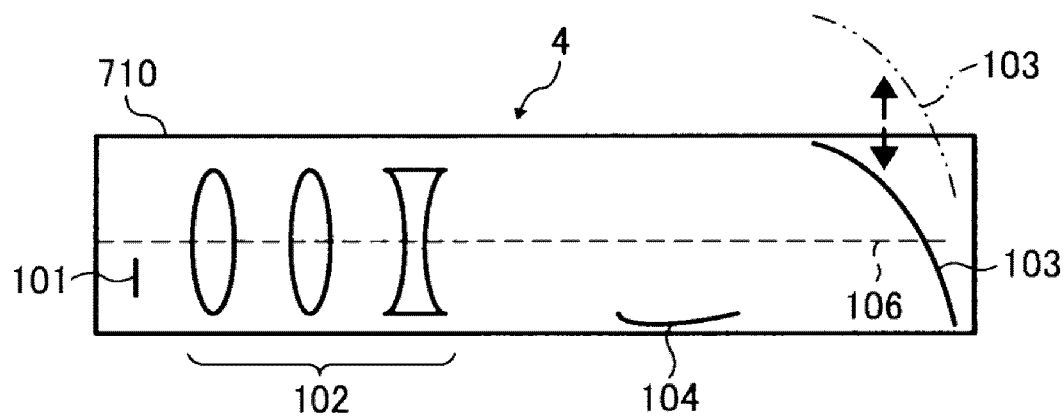
FIG. 8 illustrates a structure of a main part of a projection optical system according to a fifth embodiment of the present invention.

A fifth embodiment of the present invention will be explained with reference to FIG. 8.

A projector main body 4 in a projection optical system according to the fifth embodiment includes a case 710 which is in a rectangular solid shape, and the image forming element 101, the first optical system 102, and the second optical system 112 are housed in the case 710 without bulging outside.

The first reflecting surface 103 corresponding to the first optical system 102 of the second optical system 112 is provided slidably in the vertical direction of an image formed on the screen 105.

An upper surface of the case 710 corresponding to the first reflecting surface 103 is opened with a dimension permitting the sliding of the first reflecting surface 103, and the rest of the upper surface is covered with a translucent material. When in use, as illustrated in FIG. 8, the first reflecting surface 103 is pulled up from a non-use position (storage position) illustrated by a solid line to a use position illustrated by a chain double-dashed line and is set there, and is positioned by a stopper not illustrated.

Other additional compositions of the case 710 are similar to those explained in the fourth embodiment.

In the above-mentioned embodiments, turning and sliding of the first reflecting surface 103 are explained separately, but a mechanism which performs these operations at the same time can be employed.

A sixth embodiment will be explained with reference to FIG. 9.

Although examples of application of the present invention to the front projector are explained in the above-mentioned embodiments, the present invention can be applied to a rear projector (back projection type) directly as well without changing the optimization of the projector main body.

The structure illustrated in FIG. 1 can be applied to the rear projector directly. Here, an example of a structure in which compactness of the entire device is improved will be explained.

Light flux emitted from the image forming element 101 is bent by an optical path bent mirror 120 in the first optical system which includes a plurality of lenses, and enters into the second optical system. The optical path bent mirror 120 is provided in the first optical system to bend the light path and thus to reduce a thickness of the entire device (in the Z direction).

In the present embodiment, the optical path bent mirror 120 is disposed in the first optical system, but it is not limited to this, i.e., the optical path bent mirror 120 can be disposed between the first and the second optical systems, or between the image forming element 101 and the first optical system. In addition, the light flux can be bent one or more than one time.

Figure 9:
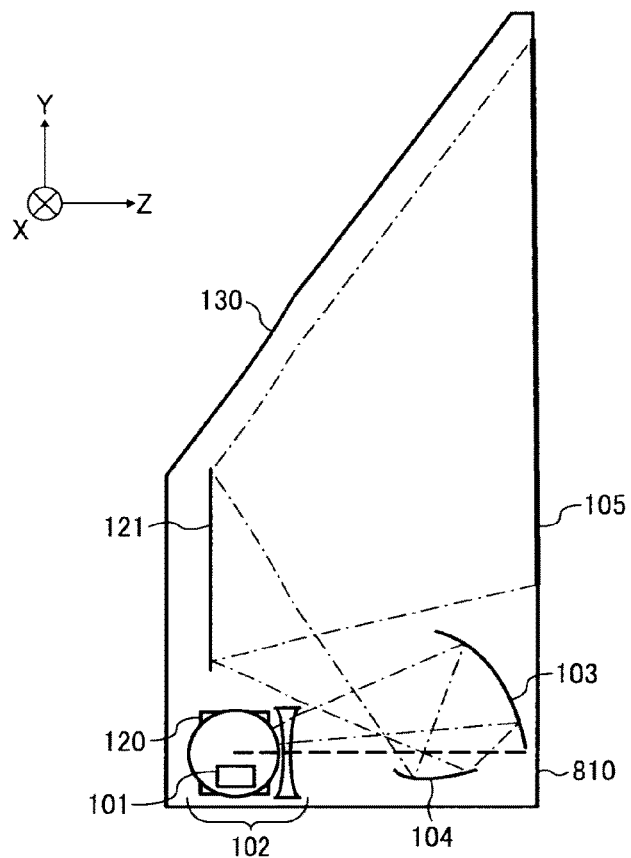
FIG. 9 illustrates a schematic structure of a rear projection optical system according to a sixth embodiment of the present invention.

In FIG. 9, the optical path is bent from a vertical direction of the paper (the X direction) to the Z direction for about 90 degrees, but it is not limited to 90 degrees. In addition, no bending of the optical path is possible.

The light flux enters into the second optical system and is reflected by two curved surface mirrors (the reflecting surfaces 103, 104), and then exits from the second optical system, and intersects only once with the light flux from the first optical system 102 to the first reflecting surface 103 on the YZ plane. And then, intersected projection light is reflected by a projection light folding mirror 121 which includes a plane mirror and is arranged on a back face of a case 810 (the left side in FIG. 9), and produces an image on the screen 105 arranged on a front face of the case (the right side in FIG. 9).

The thickness of the entire device (in the Z direction) can be thinned by folding back the projection light.

Figure 10:
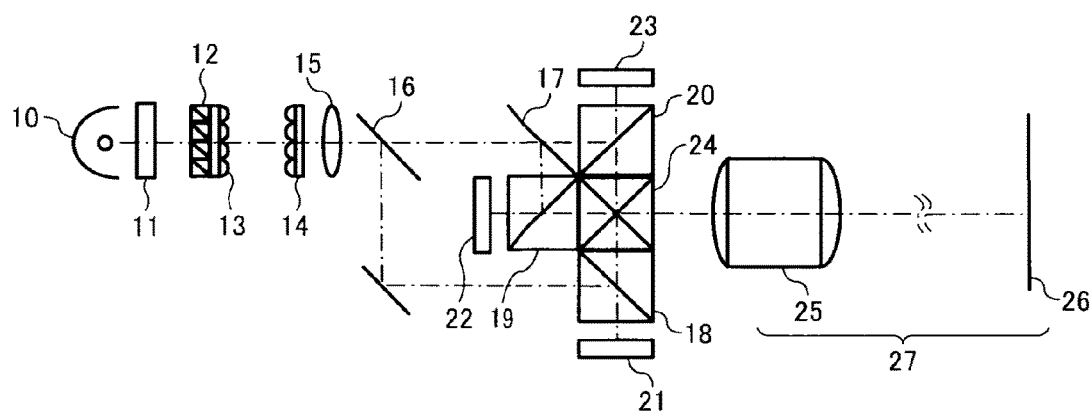
FIG. 10 illustrates a schematic structure of an image display device according to a seventh embodiment of the present invention.

A seventh embodiment (an image display device) will be explained with reference to FIG. 10.

The image display device according to the present embodiment, for example includes the above-mentioned projection optical system. A constitutional example of the image display device is illustrated in FIG. 10.

Reference number 10 represents a lamp light source as a source of light. A xenon lamp, a halogen lamp, a metal halide lamp, and an extra-high-pressure mercury lamp or the like can be used as the lamp light source. Or else, a solid source of light such as LED, LD, and laser can be used.

UV component and IR component contained in source light can be cut by a cut filter 11, therefore deterioration of the optical element can be suppressed.

A polarization conversion element 12 converts a polarization property of the above-mentioned ray into a linear polarization, therefore the light use efficiency can be improved.

Illumination light quantity distribution can be made uniform by a couple of fry eye lens arrays 13 and 14. An illuminating angle and an illuminating area to a light valve (an image forming element) can be adjusted by a condenser lens 15.

The light flux that has passed through the fry eye lens 14 reaches a first dichroic mirror 16. The first dichroic mirror 16 selects and reflects a blue wavelength component, and separates the blue illumination optical path with illumination optical paths of other colors.

A second dichroic mirror 17 selects and reflects a green wavelength component, and separates green and red illumination optical paths. Reflected light of the first dichroic mirror 16 is reflected by a first polarization separation element 18, and illuminates a first image forming element 21. Reflected light of the second dichroic mirror 17 is reflected by a second polarization separation element 19, and illuminates a second image forming element 22.

Transmitted light of the second dichroic mirror 17 is reflected by a third polarization separation element 20, and illuminates a third image forming element 23. The image forming elements 21, 22, and 23 described here are reflective image forming elements.

The illumination light to the first image forming element 21 is modulated by the first image forming element 21, and an image signal of the blue wavelength component is given.

The illumination light to the second image forming element 22 is modulated by the second image forming element 22, and an image signal of the green wavelength component is given. The illumination light to the third image forming element 23 is modulated by the third image forming element 23, and an image signal of the red wavelength component is given.

The reflected light modulated by the first image forming element 21 transmits the first polarization separation element 18, and is combined with reflected light of other colors by a cross prism 24. The reflected light modulated by the second image forming element 22 transmits the second polarization separation element 19, and is combined with reflected light of other colors by the cross prism 24.

The reflected light modulated by the third image forming element 23 transmits the third polarization separation element 20, and is combined with reflected light of other colors by the cross prism 24. The reflected light combined by the cross prism 24 enters into a projection optical system main body part 25, and reaches a screen 26 through the projection optical system main body part 25, and produces an image of the image forming element on the screen 26.

The above-mentioned projection optical system in each embodiment can be used as a projection optical system 27 according to the present embodiment which includes the projection optical system main body part 25 and the screen 26.

An enlargement image display device of 3CCD can be constituted according to the above-mentioned constitution example.

In addition, the projection optical system according to the present invention can be applied to an image display device which includes a transmissive light valve device.

Or else, the projection optical system according to the present invention can be applied to an image display device which displays an image in a field sequential with one light valve device.

Next a numeric embodiment will be explained.

The numeric embodiment (corresponding to the structure illustrated in FIG. 5) which is a design example of a projection optical system is explained below.

Surface number, curvature radius (R), surface distance (D), refractive index and Abbe number of the projection optical system are shown in Table 1.

In Table 1, "O" in Column "*1" represents an aspheric surface. And twenty-fourth, twenty-fifth, thirty-first and thirty-second surfaces shown in Table 1 are rotation symmetry aspheric surfaces, and thirty-fourth and thirty-fifth surfaces are anamorphic polynomial adjustable surfaces.

In Table 1, "O" in Column "*2" represents a reflecting surface. That is, the thirty-fourth and thirty-fifth surfaces are mirrors.

Equivalent optical path length to a case in which a cross prism or a polarization beam splitter is provided is given from an object to an eighth surface.

TABLE 1

| Surface No. | R (mm) | D (mm) | Refractive index | Abbe number | *1 | *2 |
|---|---|---|---|---|---|---|
| Object | 0.000 | 3.55 | | | | |
| 1 | 0.000 | 1.80 | 1.517 | 64.2 | | |
| 2 | 0.000 | 0.85 | 1.458 | 67.7 | | |
| 3 | 0.000 | 20.56 | 1.589 | 61.3 | | |
| 4 | 0.000 | 3.25 | 1.589 | 61.3 | | |
| 5 | 0.000 | 25.00 | 1.517 | 64.2 | | |
| 6 | 0.000 | 0.10 | 1.458 | 67.7 | | |
| 7 | 0.000 | 2.00 | 1.517 | 64.2 | | |
| 8 | 0.000 | 3.81 | | | | |
| 9 | 60.955 | 7.41 | 1.572 | 68.4 | | |
| 10 | −82.348 | 18.20 | | | | |
| 11 | 82.150 | 1.60 | 1.835 | 43 | | |
| 12 | 20.234 | 9.65 | 1.497 | 81.6 | | |
| 13 | −77.994 | 16.54 | | | | |
| 14 | 193.762 | 3.70 | 1.501 | 79.6 | | |
| 15 | −128.903 | 3.56 | | | | |
| 16 | −38.633 | 3.17 | 1.53 | 64.5 | | |
| 17 | −26.472 | 0.10 | | | | |
| 18 | 0.000 | 3.88 | | | | |
| 19 | −77.484 | 4.18 | 1.818 | 37 | | |
| 20 | 52.543 | 2.98 | | | | |
| 21 | 67.246 | 3.97 | 1.712 | 47.5 | | |
| 22 | −67.352 | 0.00 | | | | |
| 23 | 0.000 | 41.98 | | | | |
| 24 | 47.197 | 9.73 | 1.533 | 56.7 | O | |
| 25 | 45.615 | 1.50 | | | O | |
| 26 | 44.445 | 13.49 | 1.615 | 42.5 | | |
| 27 | −139.183 | 2.10 | 1.806 | 31.2 | | |
| 28 | 120.890 | 16.39 | | | | |
| 29 | 258.232 | 2.00 | 1.743 | 27.5 | | |
| 30 | 29.653 | 5.83 | | | | |
| 31 | 62.183 | 7.00 | 1.533 | 56.7 | O | |
| 32 | 70.997 | 61.16 | | | O | |
| 33 | 0.000 | 60.00 | | | | |
| 34 | 0.000 | −35.51 | | | O | O |
| 35 | 0.000 | −700.00 | | | O | O |
| Image | 0.000 | 0.00 | | | | |

The rotation symmetry aspheric surface is represented by an aspheric surface formula, i.e., $$Z = c \cdot r^2 / [1 + \sqrt{\{1 - (1+k)c^2 r^2\}}] + A r^4 + B r^6 + C r^8$$

wherein Z represents a depth in the optical axis direction, c represents a paraxial curvature radius, r represents a distance from the optical axis in a direction orthogonal to the optical axis, k represents a constant of a cone, and A, B, C . . . represent higher-order aspheric coefficients. A shape of the rotation symmetry aspheric surface is defined by values of k, A, B, and C . . . .

The anamorphic polynomial adjustable surface includes a shape represented by the following formula, i.e., $$Z = X2 \cdot x^2 + Y2 \cdot y^2 + X2Y \cdot x^2 y + Y3 \cdot y^3 + X4 \cdot x^4 + X2Y2 \cdot x^2 y^2 + Y4 \cdot y^4 + X4Y \cdot x^4 y + X2Y3 \cdot x^2 y^3 + Y5 \cdot y^5 + X6 \cdot x^6 + X4Y2 \cdot x^4 y^2 + X2Y4 \cdot x^2 y^4 + Y6 \cdot y^6 +$$

wherein, a projection image is set as a standard, a short axis direction is set as a Y direction, a long axis direction is set as an X direction, and a depth direction of the curved surface is set as a Z direction, and "X2, Y2, X2Y, Y3, and X2Y2, etc." are set as coefficients.

Tables 2 to 5 show aspheric coefficients. Table 6 shows the relationship between orders of the coefficients in the rotation symmetry aspheric surface formula and the coefficient codes.

TABLE 2

| | Surface No. 24 |
|---|---|
| K | 0 |
| A | −6.46E−06 |
| B | −5.11E−10 |
| C | 1.06E−12 |
| D | −3.18E−15 |
| E | −2.52E−18 |
| F | 1.08E−21 |
| G | 1.64E−23 |

TABLE 3

| | Surface No. 25 |
|---|---|
| K | 0 |
| A | −9.91E−06 |
| B | 1.11E−09 |
| C | −7.39E−13 |
| D | 4.63E−16 |
| E | −6.05E−18 |
| F | −3.41E−21 |
| G | 2.43E−23 |

TABLE 4

| | Surface No. 31 |
|---|---|
| K | 0 |
| A | −9.85E−06 |
| B | 1.49E−08 |
| C | −1.28E−11 |
| D | 2.10E−14 |
| E | −1.83E−17 |
| F | 8.94E−20 |
| G | −1.84E−22 |

TABLE 5

| | Surface No. 32 |
|---|---|
| K | 0 |
| A | −1.14E−05 |
| B | 1.45E−08 |
| C | −2.07E−11 |
| D | 2.05E−14 |
| E | 1.00E−17 |
| F | −4.02E−20 |
| G | −2.55E−23 |

TABLE 6

| Coefficient of 4-order | A |
|---|---|
| Coefficient of 6-order | B |
| Coefficient of 8-order | C |
| Coefficient of 10-order | D |
| Coefficient of 12-order | E |
| Coefficient of 14-order | F |
| Coefficient of 16-order | G |

The adjustable surface coefficients of the thirty-fourth and thirty-fifth surfaces are shown in Tables 7 and 8 respectively.

Eccentric amounts of the thirty-fourth and thirty-fifth surfaces are shown in Tables 9 and 10 respectively.

TABLE 7

| | Surface No. 34 |
|---|---|
| X2 | −0.0053456 |
| Y2 | −0.002478 |
| X2Y | 2.86E−05 |
| Y3 | 1.97E−05 |
| X4 | −1.55E−07 |
| X2Y2 | −4.30E−07 |
| Y4 | 5.59E−07 |
| X4Y | 4.47E−10 |
| X2Y3 | −8.52E−09 |
| Y5 | 2.33E−08 |
| X6 | 8.24E−11 |
| X4Y2 | −6.79E−11 |
| X2Y4 | −4.13E−10 |
| Y6 | 3.42E−10 |
| X6Y | 7.77E−13 |
| X4Y3 | 1.04E−12 |
| X2Y5 | −5.52E−12 |
| Y7 | 2.52E−12 |
| X8 | −3.56E−14 |
| X6Y2 | 5.41E−14 |
| X4Y4 | 1.54E−14 |
| X2Y6 | −1.02E−13 |
| Y8 | −1.58E−15 |
| X8Y | −1.72E−16 |
| X6Y3 | 4.94E−16 |
| X4Y5 | −1.09E−15 |
| X2Y7 | −2.09E−15 |
| Y9 | −1.61E−16 |
| X10 | 4.89E−18 |
| X8Y2 | −8.18E−18 |
| X6Y4 | −9.67E−19 |
| X4Y6 | −2.00E−17 |
| X2Y8 | −1.80E−17 |
| Y10 | −1.15E−18 |

TABLE 8

| | Surface No. 35 |
|---|---|
| X2 | 0.0003032 |
| Y2 | 3.69E−05 |
| X2Y | −4.96E−06 |
| Y3 | 1.40E−06 |
| X4 | 2.10E−09 |
| X2Y2 | 4.37E−08 |
| Y4 | −8.95E−08 |

TABLE 9

| | Surface No. 34 |
|---|---|
| Shift in Y direction (mm) | 70.73 |
| Turn in YZ plane (°) | 45.19 |

TABLE 10

| | Surface No. 35 |
|---|---|
| Shift in Y direction (mm) | −5.00 |
| Turn in YZ plane (°) | 89.40 |

Numerical aperture (NA) on an object side of the optical system in this embodiment is 0.21.

In this embodiment, the image forming element is disposed such that a center of the image forming element is shifted by −6.37 mm from the optical axis of the first optical system in the Y direction.

The size of the image forming element in this embodiment is 0.61 inches diagonal, the size of the screen is 100 inches diagonal, and the projection magnification is about 164 times.

Figure 11:
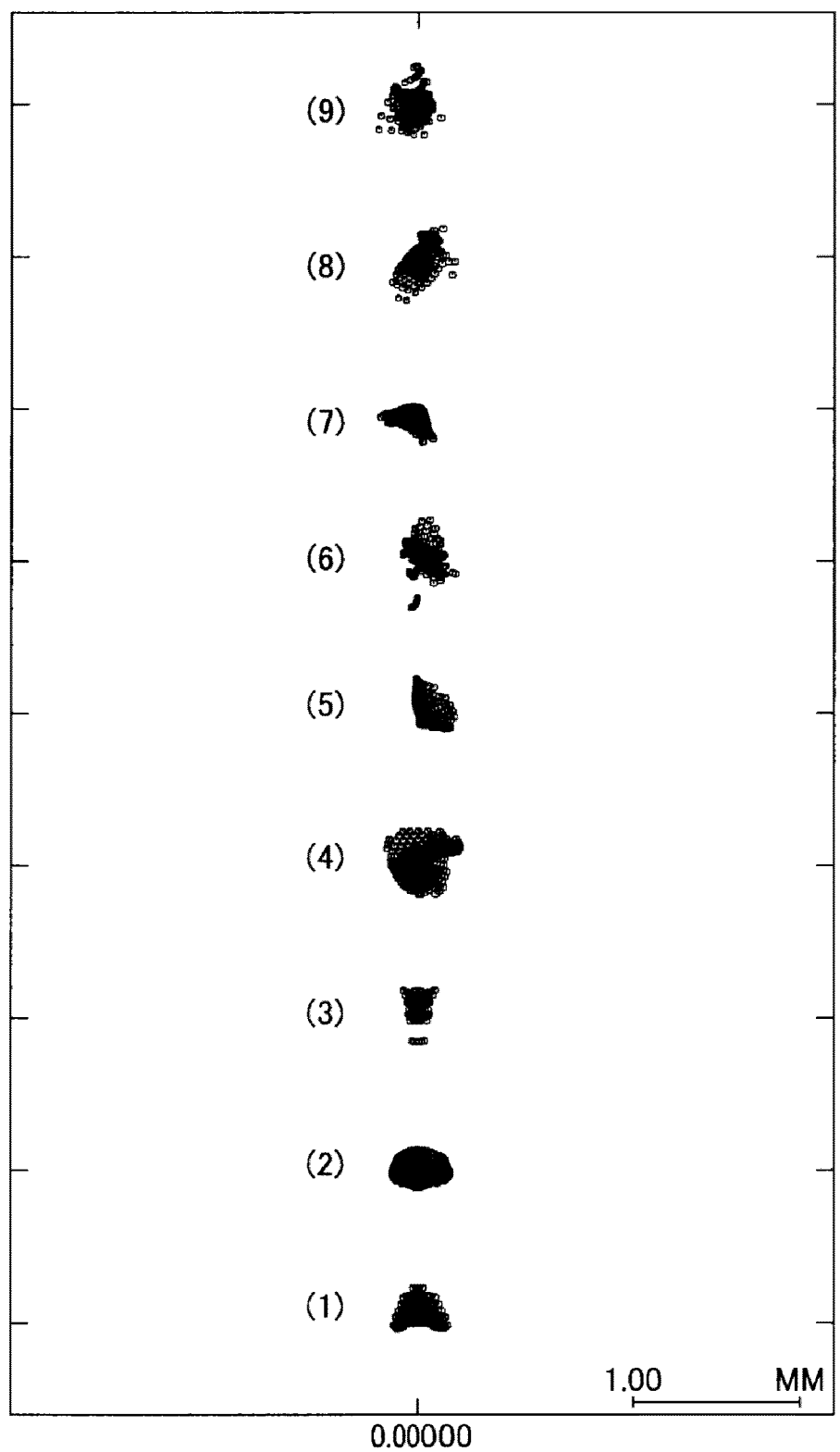
FIG. 11 illustrates a spot diagram on a screen according to another embodiment of the present invention.

FIG. 11 illustrates a spot diagram on the screen according to this embodiment.

Figure 12:
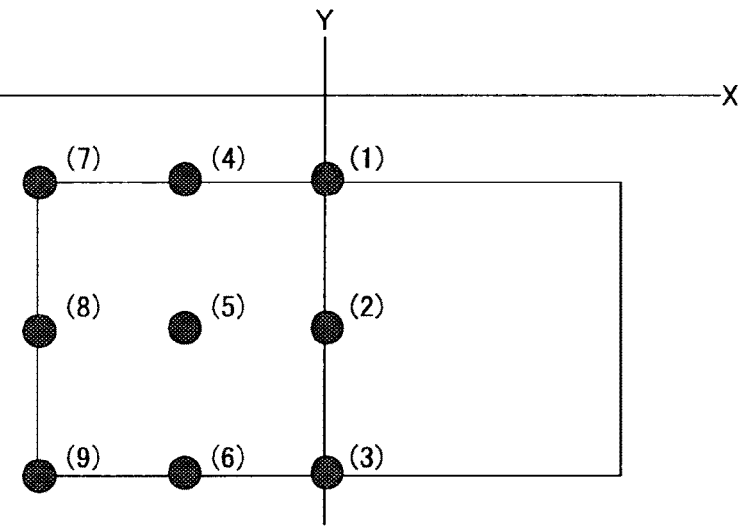
FIG. 12 illustrates correspondence relationships of positions of emitted light flux on an image forming element to those illustrated in FIG. 11.

FIG. 12 illustrates a correspondence relationship of positions of the light flux emitted from the conjugate plane A on the image forming element to those illustrated in FIG. 11. In FIG. 12, in an area of $X \leq 0$, and among object points on the image forming element on the XY plane, the X direction is trisected, and the Y direction is trisected, and then nine grid points are obtained as illustrated in FIG. 12.

These grid points are represented by (1) to (9), and the convergence condition of the light flux reaching the screen by the projection optical system is illustrated in FIG. 11 as a spot diagram.

Figure 13:
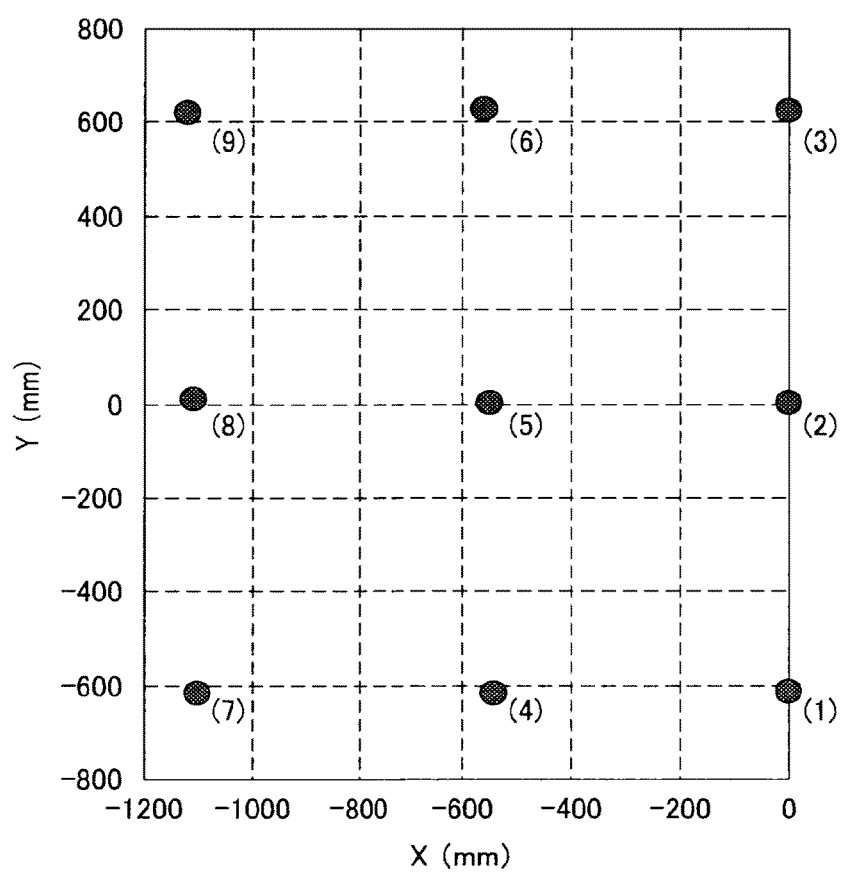
FIG. 13 illustrates TV distortion characteristics according to another embodiment of the present invention.

FIG. 13 illustrates TV distortion characteristics. Image points of each angle of field in FIG. 13 correspond to the grid points of FIG. 12, respectively, similar to FIG. 11. The TV distortion is 1% or less, and the distortion is corrected well.

In addition, the maximum length from the screen to the reflecting surface on the first optical system side of the second optical system is 769 mm. Since the distance to the screen is short, according to this embodiment, an extended projection with high magnification at close range can be achieved.

Moreover, the present embodiment explains an example in which the projection optical system is used to enlarge the image, but it is not limited to this, and a projection optical system can be used to reduce the image as well.

According to an aspect of the present invention, compactness, setting stability, portability and handling performance of a projector main body which includes a lens system and a reflecting surface excluding a screen in a front projector, can be improved, and as the projector main body can be used in both a front and a rear projector, the manufacturing cost can be reduced.

According to a preferable embodiment of the present invention, a space between a lens system and a reflecting surface can be used effectively, therefore the volume required for the entire device is small, and the projector main body is compact.

According to another preferable embodiment of the present invention, by forming an intermediate image between a first and a second optical system, light flux of each angle of field is separated in the intermediate image, therefore, at the following second optical system, especially at a reflecting surface with positive power on the first optical system side of the second optical system, distortion and field curvature generated easily in a wide-angle optical system are easily corrected.

In addition, since in the neighborhood of an exit pupil all light is gathered at a narrow position, if a reflecting surface is disposed there, an area of the reflecting surface can be reduced, and compactness of the system and cost reduction can be improved.

According to a further preferable embodiment of the present invention, a first optical system including a plurality of lenses is a coaxial optical system without eccentricity, therefore, it is easy to assemble the lenses, and as well, easy to manufacture since a single lens is also coaxial.

According to a further preferable embodiment of the present invention, a reflecting surface of a second optical system is an anamorphic adjustable surface, therefore design freedom increases and resolution performance can be improved. Especially, because power of the curved surface in an X direction and in a Y direction can be changed, it is effective in correction of astigmatism where an image location changes in the sagittal direction and the meridional direction.

According to a further preferable embodiment of the present invention, by providing a reflecting surface of a second optical system movably, for example, the bulged reflecting surface can be folded or moved in an optical axis direction or a direction of a first optical system when not projecting, therefore, the device is compact when moving or storing the device.

According to the present invention, different to improvement in reducing the size of an entire device by type, compactness of a part excluding a screen (a projector main part) is improved, and the projector main part can be applied to both a front and a rear projector, therefore the cost advantage is great.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. A projection optical system, in which a plurality of light flux emitted from one conjugate plane enters another conjugate plane and an image formed on the one conjugate plane is projected on the other conjugate plane, comprising:
   a first optical system including at least one lens; and
   a second optical system which includes at least a first reflecting surface and a second reflecting surface, each with optical power,
   wherein the first reflecting surface receives the light flux directly from the first optical system,
   wherein the second reflecting surface reflects the light flux to the other conjugate plane,
   wherein a normal line of the other conjugate plane from a center of an image projected on the other conjugate plane has no intersection with any space of the first optical system, or the second optical system, or a space between the first optical system and the second optical system, and
   wherein when a plane defined by a vertical direction of the image projected on the other conjugate plane and an extending direction of the normal line is set as a YZ plane, the light flux reflected by the second reflecting surface intersects only once with an optical path from the first optical system to the first reflecting surface on the YZ plane.

2. A projection optical system according to claim 1, wherein the first reflecting surface has a positive power.

3. A projection optical system according to claim 1, wherein on the YZ plane, with reference to an optical axis of a lens with a maximum aperture of the first optical system, if $H_1$ represents a maximum height of an effective diameter of the first reflecting surface corresponding to the first optical system from the optical axis, and $H_2$ represents a maximum height of an effective diameter of the second reflecting surface corresponding to the other conjugate plane from the optical axis, $H_1$ and $H_2$ satisfy the following condition:

$$|H_1|>|H_2|.$$

4. A projection optical system according to claim 2, wherein on the YZ plane, with reference to an optical axis of a lens with a maximum aperture of the first optical system, if $H_1$ represents a maximum height of an effective diameter of the first reflecting surface corresponding to the first optical system from the optical axis, and $H_2$ represents a maximum height of an effective diameter of the second reflecting surface corresponding to the other conjugate plane from the optical axis, $H_1$ and $H_2$ satisfy the following condition:

$$|H_1|>|H_2|.$$

5. A projection optical system according to claim 1, wherein the second reflecting surface corresponding to the other conjugate plane is disposed below a lower edge of a light flux from the first optical system to the first reflecting surface.

6. A projection optical system according to claim 1, wherein between an optical path from the first optical system to the second optical system, an intermediate image of the one conjugate plane generated by slight focusing of the plurality of light flux is formed.

7. A projection optical system according to claim 1, wherein the first optical system is a coaxial optical system.

8. A projection optical system according to claim 1, wherein the first reflecting surface includes an anamorphic adjustable surface shape.

9. A projection optical system according to claim 1, wherein the second reflecting surface includes an anamorphic adjustable surface shape.

10. A projection optical system according to claim 1, wherein at least one of the first reflecting surface or the second reflecting surface is moveable or slidable relative to the first optical system.

11. A projection optical system according to claim 10, wherein the first reflecting surface is movable or slidable relative to the first optical system.

12. A projection optical system according to claim 11, wherein the first reflecting surface is movable or slidable in the vertical direction of the image projected on the other conjugate plane, and the projection optical system further comprises:
   a case which houses the first and the second optical systems, wherein the case is a rectangular solid shape corresponding to a height of the first optical system in the vertical direction of the image projected on the other conjugate plane, and the first reflecting surface is configured to be selectively set at a use position protruded from the case or a non-use position at which the first reflecting surface is housed in the case.

13. A projection optical system according to claim 1, wherein the light flux from the second reflecting surface is folded by a folding mirror, and the other conjugate plane is provided on the second optical system side in the extending direction of the normal line.

14. A projection optical system according to claim 13, wherein the first optical system includes a mirror, a light path of the first optical system is bent by the mirror, and a length of the projection optical system in the extending direction of the normal line is reduced.

15. An image display device, comprising:
   at least one image forming element; and
   the projection optical system according to any one of claims 7-13, which is configured to enlarge or reduce an optical image signal modulated by the at least one image forming element.

* * * * *